United States Patent
Yoshida et al.

(10) Patent No.: US 7,487,293 B2
(45) Date of Patent: Feb. 3, 2009

(54) DATA STORAGE SYSTEM AND LOG DATA OUTPUT METHOD UPON ABNORMALITY OF STORAGE CONTROL APPARATUS

(75) Inventors: Masahiro Yoshida, Kawasaki (JP); Takeshi Obata, Kawasaki (JP); Taichi Oono, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 375 days.

(21) Appl. No.: 11/220,574

(22) Filed: Sep. 8, 2005

(65) Prior Publication Data
US 2006/0218344 A1    Sep. 28, 2006

(30) Foreign Application Priority Data
Mar. 24, 2005  (JP)  ............... 2005-085285

(51) Int. Cl.
G06F 12/16  (2006.01)
G06F 11/00  (2006.01)
G06F 19/00  (2006.01)

(52) U.S. Cl. .............. 711/114; 700/245; 714/6
(58) Field of Classification Search ........ None
See application file for complete search history.

(56) References Cited

U.S. PATENT DOCUMENTS 7,089,448 B2 *  8/2006  Hinshaw et al. ........... 714/6

2003/0120386 A1 *  6/2003  Milligan et al. .......... 700/245

FOREIGN PATENT DOCUMENTS

| JP | 08-306120 | 11/1996 |
|---|---|---|
| JP | 2000-293389 | 10/2000 |
| JP | 2001-256003 | 9/2001 |
| JP | 2003-316525 | 11/2003 |

* cited by examiner

Primary Examiner—Hyung S Sough
Assistant Examiner—Duc T Doan
(74) Attorney, Agent, or Firm—Staas & Halsey LLP

(57) ABSTRACT

A storage system have a plurality of control modules which control a plurality of disk storage devices, in which system information reading/writing is possible even when problems arise in paths with a plurality of disk devices, and moreover log data can be output even upon occurrence of an abnormality in a control module. A plurality of control modules has built-in a pair of system disk device units which store log data. Upon occurrence of an abnormality in one control module, a system disk unit of one control module is removed and mounted in another control module, and the log data of the mounted system disk unit is output by the another control module.

14 Claims, 14 Drawing Sheets

FIG. 16

| SYSTEM DISK | CM-0 | 1 | WWN-1 | F |
|---|---|---|---|---|
| | | 2 | WWN-2 | F |
| | CM-1 | 1 | | |
| | | 2 | | |
| | ⋮ | | ⋮ | |
| USER DISK | | | WWN-n | F |
| | | | ⋮ | |
| | | | WWN-z | |

470 points to the right portion of the table.

FIG. 17

START

S30 — DATA EQUIVALENCE PROCESSING FROM PAIRED SYSTEM DISK

ACQUISITION OF LOG DATA INFORMATION OF MALFUNCTION SYSTEM DISK

S32 — SET PAIRED SYSTEM DISK LOG WRITING AREA

S34 — WRITE PAIRED SYSTEM DISK LOG DATA INFORMATION

END

DATA STORAGE SYSTEM AND LOG DATA OUTPUT METHOD UPON ABNORMALITY OF STORAGE CONTROL APPARATUS

CROSS-REFERENCE TO RELATED APPLICATIONS

This application is based upon and claims the benefit of priority from the prior Japanese Patent Application No. 2005-085285, filed on Mar. 24, 2005, the entire contents of which are incorporated herein by reference.

BACKGROUND OF THE INVENTION

1. Field of the Invention

This invention relates to a data storage system used as an external storage apparatus for a computer and to a log data output method upon occurrence of an abnormality for a storage control apparatus, and in particular relates to a data storage system having, among numerous disk devices, a disk device used by a user and a system disk device used by the apparatus, and to an output method upon occurrence of an abnormality for a storage control apparatus.

2. Description of the Related Art

As data has assumed various electronic forms in recent years and has come to be handled by computers, independently of host computers executing data processing, data storage apparatuses (external storage apparatuses) capable of storing large amounts of data efficiently and with high reliability have become increasingly important.

As such data storage apparatus, disk array apparatuses comprising large-capacity disk devices (for example, magnetic disk and optical disc devices) and disk controllers used to control such large-capacity disk devices have come into use. Such disk array apparatuses have memory serving as a disk cache. By this means, when read requests and write requests are received from a host computer, the time required to access data can be shortened, and enhanced performance can be achieved.

In general, a disk array apparatus has a plurality of principal units, that is, channel adapters which are portions for connection to host computers, disk adapters which are portions for connection to disk drives, memory having a cache area, a control unit which serves to control the cache memory, and large-capacity disk drives.

FIG. 20 explains the technology of the prior art. The disk array apparatus 102 shown in FIG. 20 comprises two control managers (memory, including cache memory, and a control portion) 10; each control manager 10 is connected to channel adapters 11 and disk adapters 13.

The two control managers 10, 10 are directly connected by a bus 10c so as to enable communication. The channel adapters 11 are connected to host computers (not shown) by for example fiber channel or Ethernet (a registered trademark). The disk adapters 13 are connected to each of the disk drives in disk enclosures 12 by, for example, fiber channel cable.

A disk enclosure 12 has two ports (for example, fiber channel ports); these two ports are connected to different disk adapters 13. By this means redundancy is imparted, and fault tolerance is improved. (See for example Japanese Patent Laid-open No. 2001-256003)

In such a large-capacity data storage system, a large amount of information (called system information) is necessary for control by controllers (control units, channel adapters, disk adapters and similar). For example, system information includes firmware necessary to operate controllers, backup data for the apparatus configuration, and log data for various tasks and threads.

The firmware comprises control programs for controllers; in particular, in a disk array (RAID configuration), numerous control programs are necessary. Backup data for the apparatus configuration is data used to convert from host-side logical addresses to physical disk addresses; a large amount of data is necessary, according to the number of disk devices and number of hosts. Log data is state data for each task and thread, used for fault recovery and fault prevention, and also constitutes a large volume of data.

Such system data is generally stored in a nonvolatile large-capacity storage device; in the prior art, as shown in FIG. 20, one or more of the disk drives 120 in the disk enclosure 12 connected by cables to the disk adapters 13 was used for storage of such data. A disk drive which stores this system data is called a system disk.

That is, a portion of the numerous disk drives connected to controllers are used as system disks, and the other disk drives are used as user disks. As a consequence of this conventional technology, as indicated in FIG. 20, any of the controllers 10 can access system disks 120.

However, in addition to redundancy, in recent years storage systems have been required to continue operation even upon occurrence of a fault in any portion of the system. In the technology of the prior art, if a problem arises in the path between a controller and a disk enclosure, such as for example between a disk adapter and a disk enclosure, reading and writing of the system disk 120 can no longer be executed.

Consequently even if the controller and other paths are normal, the controller cannot read firmware or apparatus configuration backup data from the system disk, and operations using other routes become difficult. Further, the controller cannot read or write log data to and from the system disk, impeding analysis upon occurrence of a fault and diagnostics for fault prevention.

Moreover, upon occurrence of a power outage it is necessary to switch to battery operation and to back up the data in cache memory to the system disk. In the technology of the prior art, in such cases power must also be supplied to the disk enclosure, so that a very large battery capacity is required. Furthermore, a comparatively long time is necessary to write backup data to a system disk via a disk adapter and cable, and when the cache memory capacity is large, a huge battery capacity is required.

SUMMARY OF THE INVENTION

Hence an object of this invention is to provide a data storage system and a log data output method upon occurrence of an abnormality for a data storage control apparatus, which can execute reading/writing of a system disk even when problems occur in a path between a controller and a group of disk drives, and enabling output of system disk log data even upon occurrence of an abnormality in the controller.

A further object of this invention is to provide a data storage system and a log data output method upon occurrence of an abnormality for a data storage control apparatus, enabling smaller battery capacity for backups during power outages, with an inexpensive configuration, and which can output system disk log data even upon occurrence of an abnormality in the controller.

Still another object of this invention is to provide a data storage system and a log data output method upon occurrence of an abnormality for a data storage control apparatus, enabling backups of cache memory data with a small battery capacity during power outages, and which can output system disk log data even upon occurrence of an abnormality in the controller.

In order to attain these objects, a data storage system of this invention has a plurality of disk storage devices which store data and a plurality of control modules, connected to the plurality of disk storage devices, which control access to the disk storage devices, according to access instructions from a higher-level system. And each of the control modules has memory having a cache area which stores a portion of the data stored in the disk storage devices, a control unit which controls access, a first interface portion which controls the interface with the higher-level system, a second interface portion which controls the interface with the plurality of disk storage devices, and a pair of system disk units, connected to the control unit, which store, at least, log data of the control unit. Further one control module, upon the occurrence of an abnormality in one of the other control modules, detects that one system disk unit of the other control module is inserted into a system disk slot of the one control module, incorporates the one system disk unit of the other control module, and outputs the log data of the one system disk unit of the other control module.

Further, a log data output method upon occurrence of an abnormality for a storage control apparatus of this invention is a log data output method upon occurrence of an abnormality for a storage control apparatus, connected to a plurality of disk storage devices which store data, and having a plurality of control modules which control access of the disk storage devices according to access instructions from a higher-level system, where each of the control modules has memory having a cache area which stores a portion of the data stored in the disk storage devices, a control unit which controls access, a first interface portion which controls the interface with the higher-level system, a second interface portion which controls the interface with the plurality of disk storage devices, and a pair of system disk units, connected to the control unit, which store, at least, log data of the control unit. The output method has a step, upon an abnormality in another control module, of detecting that one system disk unit removed from the other control module is inserted into a system disk slot of one control module; a step of incorporating the one system disk unit of the other control module into the one control module; and a step of outputting the log data of the incorporated one system disk unit of the other control module using the one control module.

In this invention, it is preferable that the one control module, after incorporating the one system disk unit of the other control module, copy the log data of the system disk unit of the one control module to the incorporated system disk unit, without destroying the log data of the other control module in the system disk unit of the other control module.

In this invention, it is preferable that the one control module read an identifier of the inserted system disk unit, and judge whether the one system disk unit of the other control module has been incorporated.

In this invention, it is preferable that when the one control unit judges, from the identifier, that the inserted system disk unit is not the one system disk unit of the other control module, the one control unit copy the log data of the system disk unit of the one control module to the incorporated system disk unit.

In this invention, it is preferable that the one control module read the log data area of the incorporated system disk unit of the other control module, and copy, to a system disk unit area other than the log data area of the other control module, the log data of the system disk unit of the one control module.

In this invention, it is preferable that the one control module separate the other system disk unit of the one control module, in response to an instruction from an external apparatus, and release the system disk slot to enable insertion of the system disk unit of the other control module.

In this invention, it is preferable that the one control module output the log data of the other control module from the incorporated system disk unit, in response to a log data acquisition instruction from an external apparatus.

In this invention, it is preferable that the one control module output the log data of the other control module to the external apparatus.

A system disk is built into the control module, so that even if a problem arises in a path between the control module and disk storage devices, if the control module and other paths are normal, the control module can read firmware and apparatus configuration backup data from the system disk, and operations using other paths are possible; moreover, log data can be read and written, so that analysis upon occurrence of a fault and diagnostics for fault prevention are possible.

Further, when in the event of a power outage the power is switched to batteries and the data in cache memory is backed up to a system disk, there is no need to supply power to a connected disk storage device, so that the battery capacity can be made small.

And, even if an abnormality occurs in the other control module, the system disk drive of the other control module can be inserted into one control module and reading performed by the one control module, so that even if a system disk drive is built into a control module, log data of the system disk of the abnormal control module can be output.

BRIEF DESCRIPTION OF THE DRAWINGS

FIG. 16 explains the configuration information definition table in one embodiment of the invention;

FIG. 17 shows the flow of information extraction processing in FIG. 15;

DESCRIPTION OF THE PREFERRED EMBODIMENTS

Below, embodiments of the invention are explained, in the order of a data storage system, read/write processing, mounted configuration, log data output method upon abnormality, log data output processing upon abnormality, and other embodiments.

Data Storage System

Figure 1:
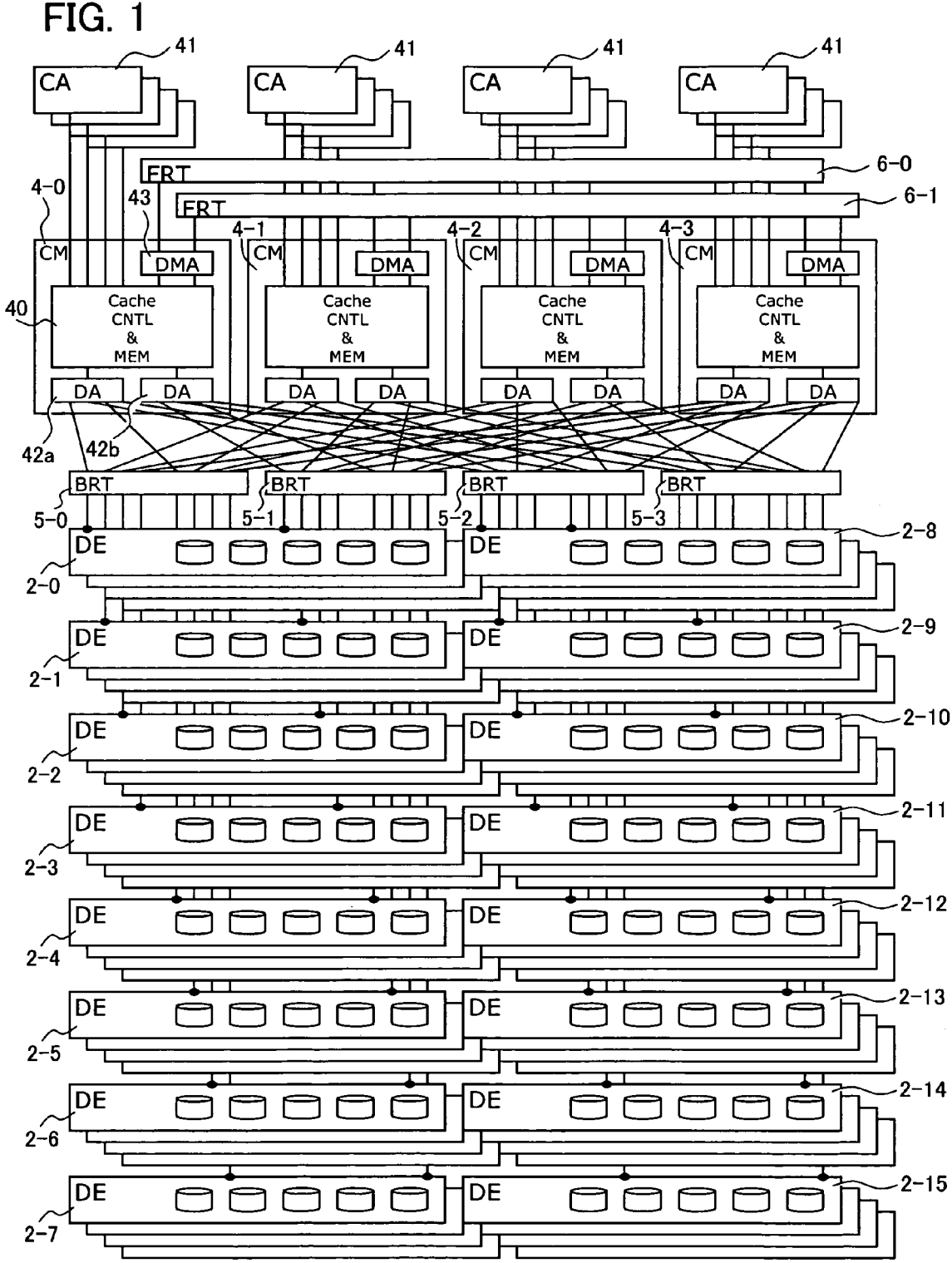
FIG. 1 shows the configuration of the data storage system of one embodiment of the invention.
Figure 2:
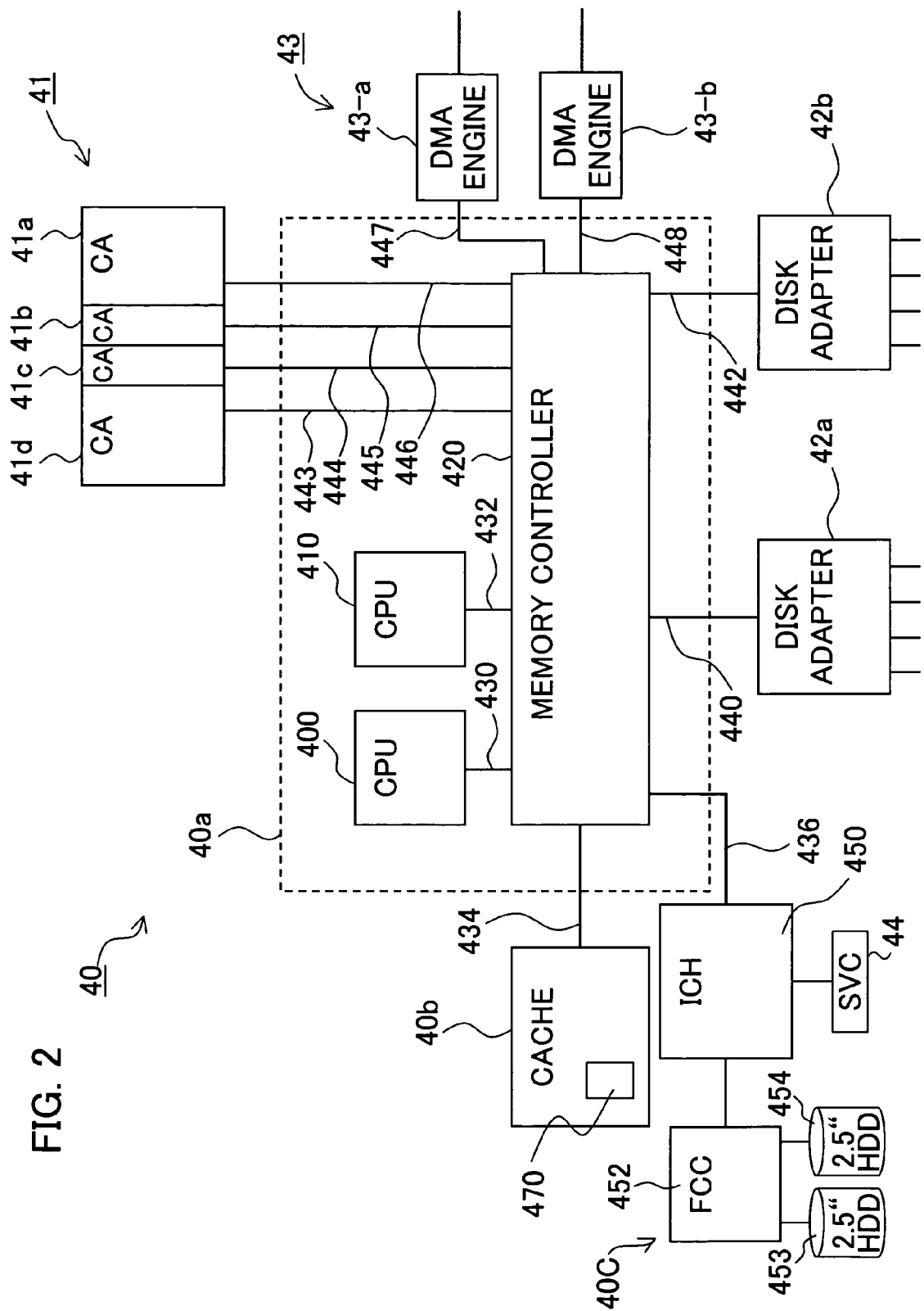
FIG. 2 shows the configuration of a control module in FIG. 1.
Figure 3:
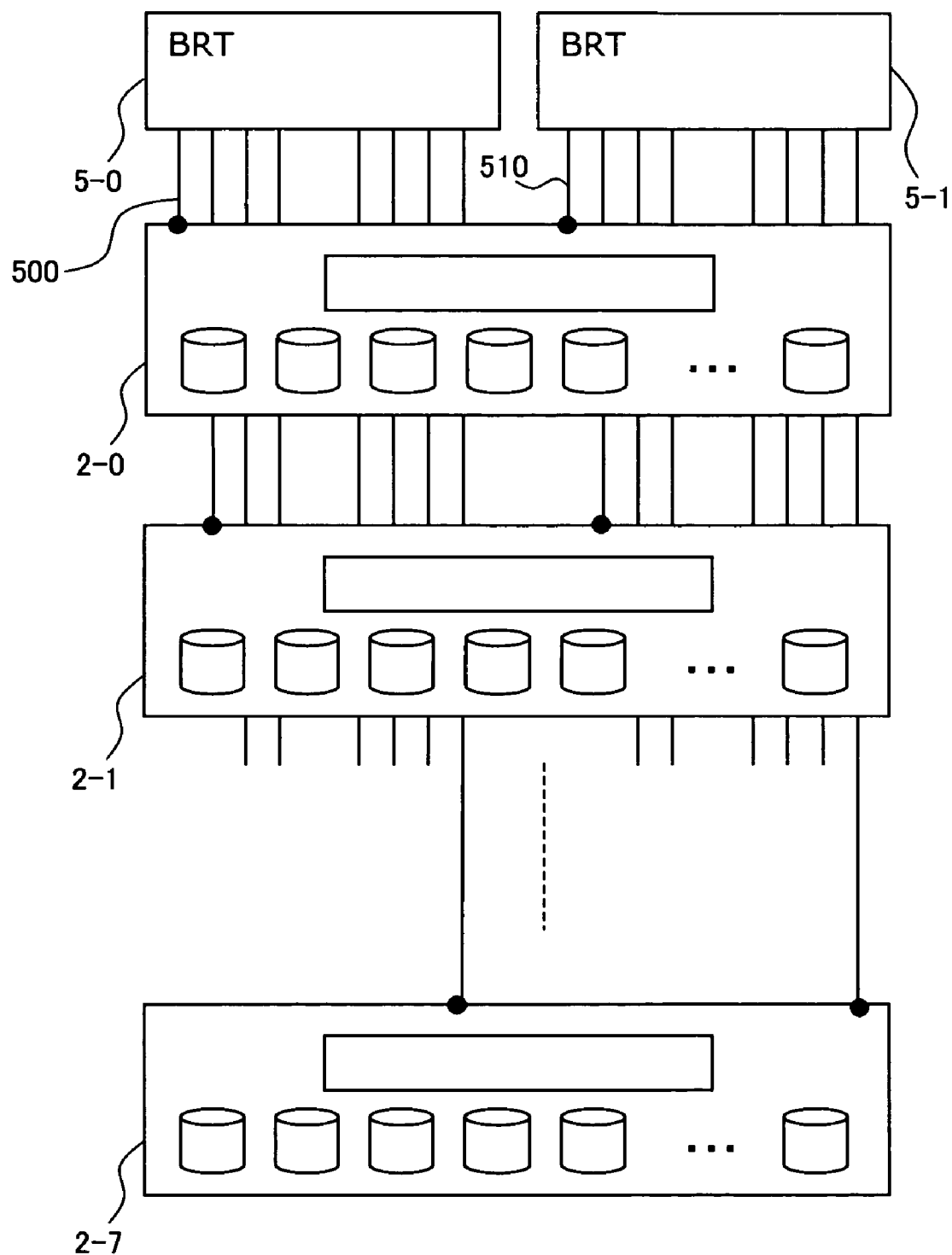
FIG. 3 shows the configuration of a back-end router and disk enclosure in FIG. 1 and FIG. 2.
Figure 4:
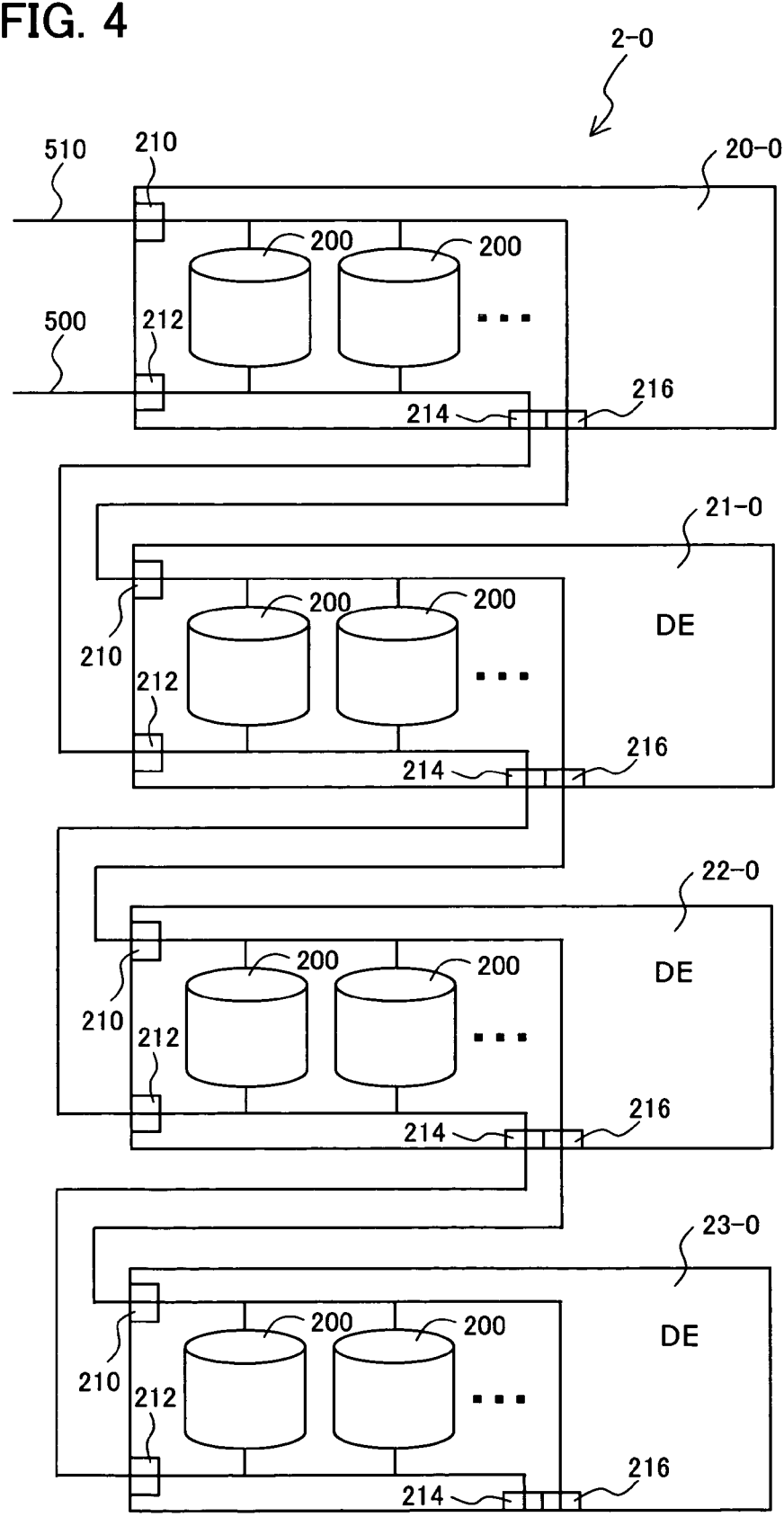
FIG. 4 shows the configuration of a disk enclosure in FIG. 1 and FIG. 3.

FIG. 1 shows the configuration of the data storage system of one embodiment of the invention, FIG. 2 shows the configuration of a control module in FIG. 1, FIG. 3 shows the configuration of a back-end router and disk enclosure in FIG. 1, and FIG. 4 shows the configuration of a disk enclosure in FIG. 1 and FIG. 3.

FIG. 1 shows a mid-scale disk array apparatus having four control modules, as an example of a data storage system. As shown in FIG. 1, the disk array apparatus 1 has a plurality of disk enclosures 2-0 to 2-15 holding data; a plurality (here, four) of control modules 4-0 to 4-3, positioned between a host computer (data processing system), not shown, and the plurality of disk enclosures 2-0 to 2-15; a plurality (here, four) of back-end routers (first switch units; hereafter "BRTs") 5-0 to 5-3, provided between the plurality of control modules 4-0 to 4-3 and the plurality of disk enclosures 2-0 to 2-15; and a plurality (here, two) of front-end routers (second switch units; hereafter "FRTs") 6-0, 6-1.

Each of the control modules 4-0 to 4-3 has a controller 40, channel adapter (first interface portion; hereafter "CA") 41, disk adapters (second interface portions; hereafter "DAs") 42a, 42b, and DMA (Direct Memory Access) engine (communication portion; hereafter "DMA") 43.

In FIG. 1, to simplify the drawing, the controller symbol "40", disk adapter symbols "42a" and "42b", and DMA symbol "43" are assigned only to the control module 4-0, and symbols are omitted for the constituent components of the other control modules 4-1 to 4-3.

The control modules 4-0 to 4-3 are explained using FIG. 2. The controllers 40 perform read/write processing based on processing requests (read requests or write requests) from a host computer, and has a memory 40b, a control unit 40a, and a system disk drive unit 40c.

The memory 40b has a cache area, which serves as a so-called cache for a plurality of disks, holding a portion of the data held in the plurality of disks of the disk enclosures 2-0 to 2-15; a configuration definition storage area 470; and other work areas.

The control unit 40a controls the memory 40b, channel adapters 41, device adapters 42, and DMA 43, and has one or a plurality (here, two) of CPUs 400, 410, and a memory controller 420. The memory controller 420 controls memory reading and writing, and also performs path switching.

The memory controller 420 is connected via a memory bus 434 to the memory 40b, via CPU bus 430, 432 to the CPUs 400, 410, and via four-lane high-speed serial buses (for example, PCI-Express) 440, 442 to the disk adapters 42a, 42b.

Similarly, the memory controller 420 is connected via four-lane high-speed serial buses (for example, PCI-Express) 443, 444, 445, 446 to the channel adapters 41 (here, four channel adapters 41a, 41b, 41c, 41d), and via four-lane high-speed serial buses (for example, PCI-Express) 447, 448 to the DMA units 43 (here, two DMA units 43-a, 43-b).

The PCI-Express or other high-speed serial buses perform packet communication, and by providing a plurality of lanes in the serial buses, the number of signal lines can be reduced with minimal delays and fast response, in so-called low-latency communication.

Further, the memory controller 420 is connected via the serial bus 436 to the system disk drive unit 40c. The system disk drive unit 40c has a bridge circuit 450, a fiber channel circuit 452, and a pair of system disk drives 453, 454.

The bridge circuit 450 connects the memory controller 420 to the fiber channel circuit 452 and to a service processor 44 provided on the outside of the control module 4-0. The service processor 44 comprises, for example, a personal computer, and is used for system state confirmation, diagnostics and maintenance.

The fiber channel circuit 452 is connected to at least two system disk drives 453, 454 (here, two hard disk drives). Hence the CPUs 400, 410 and similar can directly access the system disk drives 453, 454 via the memory controller 420. Further, the service processor 44 also can access the system disk drives 453, 454, via the bridge circuit 450.

The two system disk drives 453, 454 mirror the log data and similar. That is, a copy of the data on one of the system disk drive 453 is stored in the other system disk drive 454. In other words, the system disk drives 453, 454 are built into the control module 4-0, and the CPUs 400, 410 can access the system disk drives 453, 454 without the intervention of the DAs 42a, 42b or BRT 5-0.

The channel adapters 41a to 41d are interfaces with host computers and the channel adapters 41a to 41d are each connected to a different host computer. It is preferable that the channel adapters 41a to 41d are each connected to the interface portions of the corresponding host computers via a bus, such as for example a fiber channel or Ethernet (a registered trademark) bus; in this case, an optical fiber or coaxial cable is used as the bus.

Further, the channel adapters 41a to 41d are each configured as a portion of the control modules 4-0 to 4-3. These channel adapters 41a to 41d support a plurality of protocols as the interfaces with the corresponding host computers and the control modules 4-0 to 4-3.

Because protocols to be mounted are not the same, depending on the host computers supported, the controllers 40 which are the principal units of the control modules 4-0 to 4-3 are mounted on separated print boards, so that the channel adapters 41a to 41d can be replaced easily as necessary.

For example, protocols with host computers to be supported by the channel adapters 41a to 41d include, as described above, fiber channel and iSCSI (Internet Small Computer System Interface) supporting Ethernet (a registered trademark).

Further, as explained above, each of the channel adapters 41a to 41d is directly connected to the controller 40 by the bus 443 to 446, such as a PCI-Express bus, designed for connection of LSI (Large Scale Integrated) devices and print boards. By this means, the high throughput required between the channel adapters 41a to 41d and the controllers 40 can be achieved.

The disk adapters 42*a*, 42*b* are interfaces with each of the disk drives in the disk enclosures 2-0 to 2-15, and are connected to the BRTs 5-0 to 5-3 connected to the disk enclosures 2-0 to 2-15; here, the disk adapters have four FC (Fiber Channel) ports.

As explained above, each of the disk adapters 42*a*, 42*b* is connected directly to the controller 40 by a bus, such as a PCI-Express bus, designed for connection to LSI (Large Scale Integrated) devices and print boards. By this means, the high throughput required between the disk adapters 42*a*, 42*b* and the controllers 40 can be achieved.

As shown in FIG. 1 and FIG. 3, the BRTs 5-0 to 5-3 are multi-port switches which selectively switch the disk adapters 42*a*, 42*b* of the control modules 4-0 to 4-3 and each of the disk enclosures 2-0 to 2-15 and make connections enabling communication.

As shown in FIG. 3, each of the disk enclosures 2-0 to 2-7 is connected to a plurality (here, two) of BRTs 5-0, 5-1. As shown in FIG. 4, a plurality (here, 15) of disk drives 200, each having two ports, are installed in each of the disk enclosures 2-0 to 2-7. The disk enclosure 2-0 is configured with the necessary number of unit disk enclosures 20-0 to 23-0, each having four connection ports 210, 212, 214, 216, connected in series, to obtain increased capacity. Here, up to a maximum four unit disk enclosures 20-0 to 23-0 can be connected.

Within each of the unit disk enclosures 20-0 to 23-0, each port of each disk drive 200 is connected to two ports 210, 212 by means of a pair of FC cables from the two ports 210, 212. As explained in FIG. 3, these two ports 210, 212 are connected to different BRTs 5-0, 5-1.

As shown in FIG. 1, each of the disk adapters 42*a*, 42*b* of the control modules 4-0 to 4-3 are connected to all the disk enclosures 2-0 to 2-15. That is, the disk adapters 42*a* of each of the control modules 4-0 to 4-3 are connected to BRT 5-0 (see FIG. 3) connected to the disk enclosures 2-0 to 2-7, BRT 5-0 connected to the disk enclosures 2-0 to 2-7, BRT 5-2 connected to the disk enclosures 2-8 to 2-15, and BRT 5-2 connected to the disk enclosures 2-8 to 2-15.

Similarly, the disk adapters 42*b* of each of the control modules 4-0 to 4-3 are connected to BRT 5-1 (see FIG. 3) connected to the disk enclosures 2-0 to 2-7, BRT 5-1 connected to the disk enclosures 2-0 to 2-7, BRT 5-3 connected to the disk enclosures 2-8 to 2-15, and BRT 5-3 connected to the disk enclosures 2-8 to 2-15.

In this way, each of the disk enclosures 2-0 to 2-15 is connected to a plurality (here, two) of BRTs, and different disk adapters 42*a*, 42*b* in the same control modules 4-0 to 4-3 are connected to the two BRTs connected to the same disk enclosures 2-0 to 2-15.

By means of such a configuration, each control module 4-0 to 4-3 can access all of the disk enclosures (disk drives) 2-0 to 2-15 via either of the disk adapters 42*a*, 42*b*, and via any path.

As shown in FIG. 2, each disk adapter 42*a*, 42*b* is connected to the corresponding BRT 5-0 to 5-3 by a bus, such as for example a fiber channel or Ethernet (a registered trademark) bus. In this case, as explained below, the bus is provided as electrical wiring on the print board of the back panel.

As explained above, one-to-one mesh connections are provided between the disk adapters 42*a*, 42*b* of each of the control modules 4-0 to 4-3 and the BRTs 5-0 to 5-3 to connect all the disk enclosures, so that as the number of control modules 4-0 to 4-3 (that is, the number of disk adapters 42*a*, 42*b*) increases, the number of connections increases and connections become complex, so that physical mounting becomes difficult. However, by adopting fiber channels, requiring few signals to construct an interface, as the connections between the disk adapters 42*a*, 42*b* and the BRTs 5-0 to 5-3, mounting on the print board becomes possible.

When each of the disk adapters 42*a*, 42*b* and corresponding BRTs 5-0 to 5-3 are connected by a fiber channel, the BRTs 5-0 to 5-3 are fiber channel switches. Further, the BRTs 5-0 to 5-3 and the corresponding disk enclosures 2-0 tot 2-15 are for example connected by fiber channels; in this case, because the modules are different, connection is by optical cables 500, 510.

As shown in FIG. 1, the DMA engines 43 communicate with each of the control modules 4-0 to 4-3, and handle communication and data transfer processing with the other control modules. Each of the DMA engines 43 of the control modules 4-0 to 4-3 is configured as a portion of the control modules 4-0 to 4-3, and is mounted on the board of the controller 40 which is a principal unit of the control modules 4-0 to 4-3. Each DMA engine is directly coupled to the controllers 40 by means of the high-speed serial bus described above, and also communicates with the DMA engines 43 of the other control modules 4-0 to 4-3 via the FRTs 6-0, 6-1.

The FRTs 6-0, 6-1 are connected to the DMA engines 43 of a plurality (in particular three or more; here, four) of control modules 4-0 to 4-3, selectively switch among these control modules 4-0 to 4-3, and make connections enabling communication.

By means of this configuration, each of the DMA engines 43 of the control modules 4-0 to 4-3 executes communication and data transfer processing (for example, mirroring processing) via the FRTs 6-0, 6-1 between the controller 40 to which it is connected and the controllers 40 of other control modules 4-0 to 4-3, according to access requests and similar from a host computer.

Further, as shown in FIG. 2, the DMA engines 43 of each control module 4-0 to 4-3 comprise a plurality (here, two) of DMA engines 43-*a*, 43-*b*; each of these DMA engines 43-*a*, 43-*b* uses two FRTs 6-0, 6-1.

As indicated in FIG. 2, the DMA engines 43-*a*, 43-*b* are connected to the controller 40 by, for example, a PCI-Express bus. That is, in communication and data transfer (DMA) processing between the control modules 4-0 to 4-3 (that is, between the controllers 40 of the control modules 4-0 to 4-3), large amounts of data are transferred, and it is desirable that the time required for transfer be short, so that a high throughput as well as low latency (fast response time) are demanded. Hence as shown in FIG. 1 and FIG. 2, the DMA engines 43 and FRTs 6-0, 6-1 of the control modules 4-0 to 4-3 are connected by a bus which utilizes high-speed serial transfer bus (PCI-Express or Rapid-IO) designed so as to satisfy the demands for both high throughput and low latency.

The PCI-Express and Rapid-IO buses employ high-speed serial transfer at 2.5 Gbps; a small-amplitude differential interface called LVDS (Low Voltage Differential Signaling) is adopted as the bus interface.

Read/Write Processing

Figure 5:
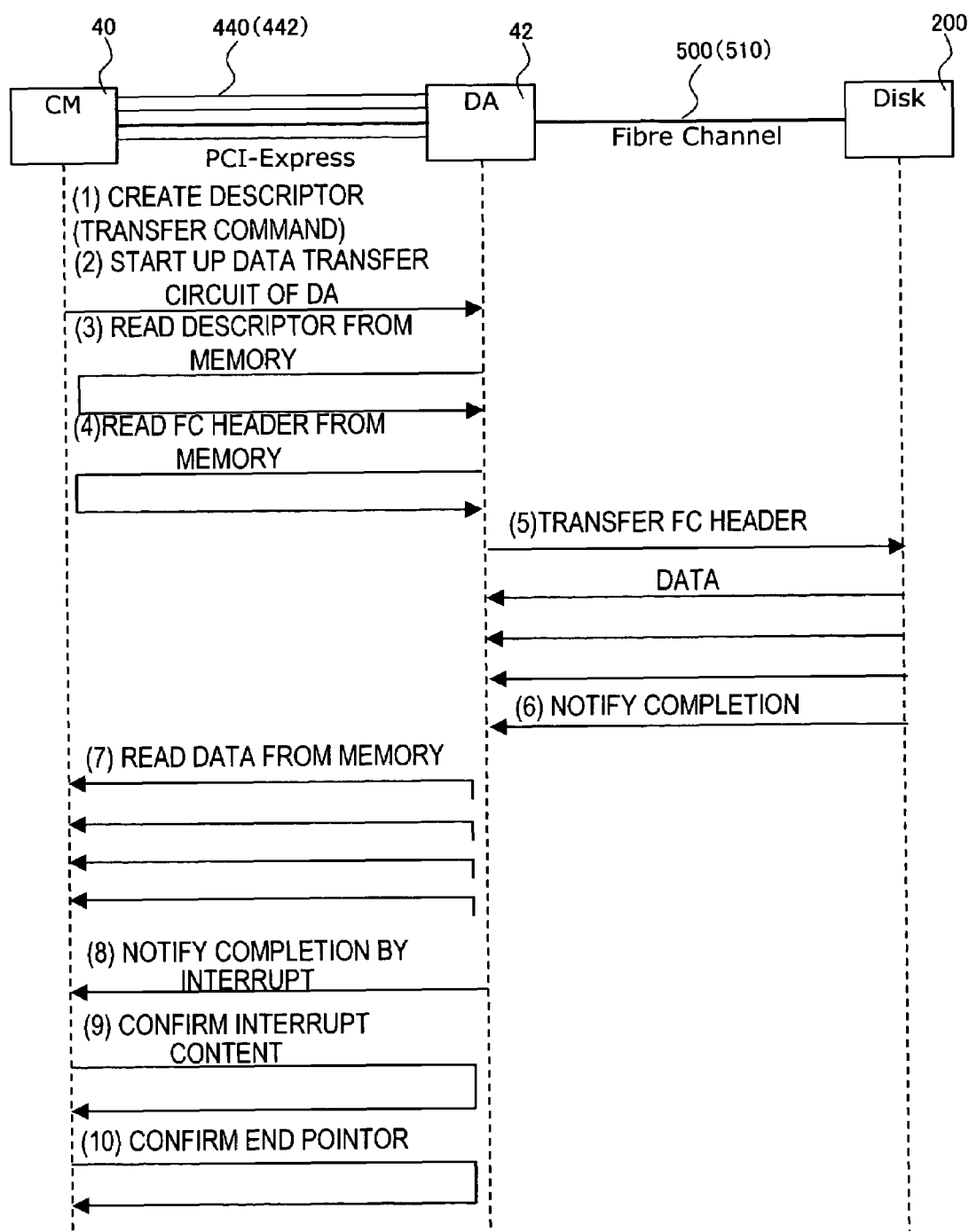
FIG. 5 explains read processing in the configuration of FIG. 1 and FIG. 2.

Next, read processing in the data storage system of FIG. 1 through FIG. 4 is explained. FIG. 5 explains read operation in the configuration of FIG. 1 and FIG. 2.

First, when a control unit (control manager) 40 receives a read request via a channel adapter 41*a* to 41*d* from one of the corresponding host computers, if the relevant data of the read request is held in the cache memory 40*b*, the relevant data held in the cache memory 40*b* is sent to the host computer via the channel adapter 41*a* to 41*d*.

If on the other hand the relevant data is not held in the cache memory 40*b*, the control manager (control portion) 40*a* first reads the relevant data from the disk drive 200 holding the relevant data into the cache area of memory 40*b*, and then transmits the relevant data to the host computer issuing the read request.

Processing to read the disk drive is explained in FIG. 5.

(1) The control unit 40*a* (CPU) of the control manager 40 creates a FC header and descriptor in the descriptor area of cache memory 40*b*. A descriptor is a command requesting data transfer by a data transfer circuit, and contains the address in the cache memory of the FC header, the address in the cache memory of the data to be transferred, the number of data bytes, and the logical address of the disk for data transfer.

(2) The data transfer circuit of the disk adapter 42 is started.

(3) The started data transfer circuit of the disk adapter 42 reads the descriptor from the cache memory 40*b*.

(4) The started data transfer circuit of the disk adapter 42 reads the FC header from the cache memory 40*b*.

(5) The started data transfer circuit of the disk adapter 42 decodes the descriptor and obtains the request disk, leading address, and number of bytes, and transfers the FC header to the relevant disk drive 200 using the fiber channel 500 (510). The disk drive 200 reads the requested data, and transmits the data over the fiber channel 500 (510) to the data transfer circuit of the disk adapter 42.

(6) Upon having read and transmitted the requested data, the disk drive 200 transmits a completion notification over the fiber channel 500 (510) to the data transfer circuit of the disk adapter 42.

(7) Upon receiving the completion notification, the data transfer circuit of the disk adapter 42 reads the read data from the memory of the disk adapter 42 and stores the data in the cache area of memory 40*b*.

(8) When read transfer is completed, the started data transfer circuit of the disk adapter 42 uses an interrupt to send completion notification to the control manager 40.

(9) The control unit 40*a* of the control manager 40 obtains the interrupt source of the disk adapter 42 and confirms the read transfer.

(10) The control unit 40*a* of the control manager 40 checks the end pointer of the disk adapter 42 and confirms the completion of read transfer.

Thus in order to obtain sufficient performance, high throughput must be maintained over all connections, but many signals (here, seven) are exchanged between the control unit 40*a* and disk adapter 42, and a low-latency bus is especially important. In this embodiment, both the PCI-Express (four-lane) bus and the Fiber Channel (4G) bus are adopted as connections having high throughput; but whereas PCI-Express is a low-latency connection, Fiber Channel is a comparatively high latency (time is required for data transfer) connection.

In this embodiment, fiber channel can be adopted in the BRTs 5-0 to 5-3 for the configuration of FIG. 1. In order to achieve low latency, although the number of bus signals cannot be decreased beyond a certain number, in this embodiment fiber channel with a small number of signal lines can be used for the connection between disk adapters 42 and BRTs 5-0; the number of signals on the back panel is reduced, providing advantages for mounting.

Next, write operation is explained. When a write request is received from one of the host computers via the corresponding channel adapter 41*a* to 41*d*, the channel adapter 41*a* to 41*d* which has received the write request command and write data queries the control manager 40 for the address in the cache area of memory 40*b* to which to write the write data.

When the channel adapter 41*a* to 41*d* receives the response from the control manager 40, the write data is written to the cache area of memory 40*b* of the control manager 40, and in addition the write data is written to the cache area in the memory 40*b* in at least one control manager 40 different from the control manager 40 in question (that is, the control manager 40 of a different control module 4-0 to 4-3). For this purpose the DMA engine 43 is started, and the write data is also written to the cache area of memory 40*b* in the control manager 40 of another control module 4-0 to 4-3, via an FRT 6-0, 6-1.

Here, by means of redundant writing (mirroring) of the data, even in the event of an unforeseen hardware failure of a control module 4-0 to 4-3 or control manager 40, data loss can be prevented. Finally, when writing of cache data to the cache areas of the plurality of memory units 40*b*ends normally, the channel adapter 41*a* to 41*d* sends notification of completion to the host computer, and processing ends.

The write data must then be written back (write-back) to the relevant disk drive. The control unit 40*a* writes back the write data in the cache area of memory 40*b* to the disk drive 200 holding the relevant data, according to an internal schedule. This disk drive and the write processing are explained using FIG. 6.

(1) The control unit 40*a* (CPU) of the control manager 40 creates an FC header and descriptor in the descriptor area of memory 40*b*. The descriptor is a command requesting data transfer by a data transfer circuit, and contains the address in cache memory of the FC header, the address in cache memory of the data to be transferred, the number of data bytes, and the logical address of the disk for data transfer.

(2) The data transfer circuit of the disk adapter 42 is started.

(3) The started data transfer circuit of the disk adapter 42 reads the descriptor from the memory 40*b*.

(4) The started data transfer circuit of the disk adapter 42 reads the FC header from the memory 40*b*.

(5) The started data transfer circuit of the disk adapter 42 decodes the descriptor and obtains the request disk, leading address, and number of bytes, and reads the data from the cache area of memory 40*b*.

(6) After the completion of reading, the data transfer circuit of the disk adapter 42 transfers the FC header and data to the relevant disk drive 200 via fiber channel 500 (510). The disk drive 200 writes the transferred data to an internal disk.

(7) Upon completion of data writing, the disk drive 200 sends notification of completion to the data transfer circuit of the disk adapter 42 via the fiber channel 500 (510).

(8) Upon receiving notification of completion, the started data transfer circuit of the disk adapter 42 uses an interrupt to send completion notification to the control manager 40.

(9) The control unit 40*a* of the control manager 40 obtains the interrupt source of the disk adapter 42 and confirms the write operation.

(10) The control unit 40*a* of the control manager 40 checks the end pointer of the disk adapter 42 and confirms the completion of the write operation.

Figure 6:
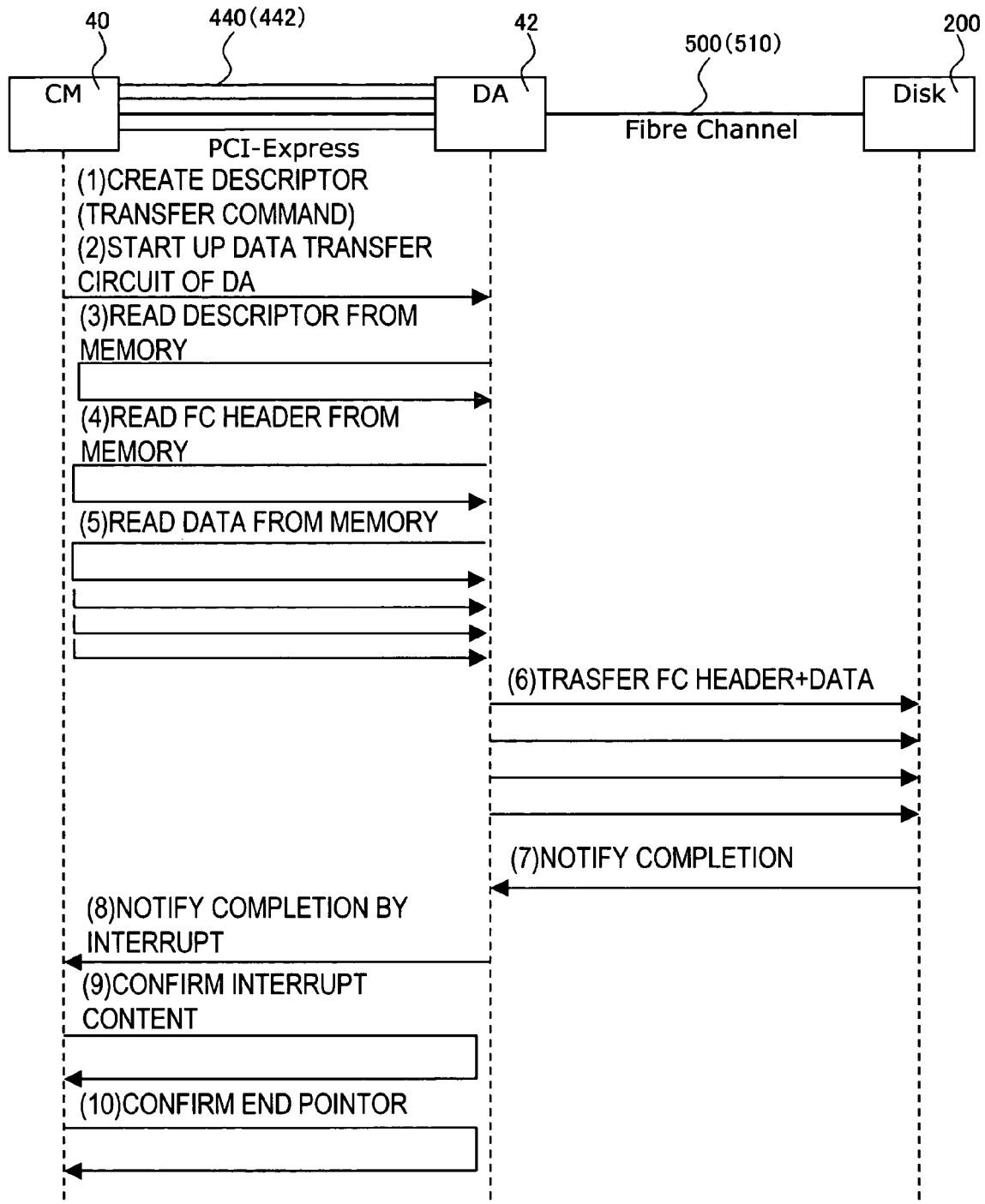
FIG. 6 explains write processing in the configuration of FIG. 1 and FIG. 2.

In both FIG. 5 and FIG. 6, arrows indicate the transfer of data and other packets, and U-shaped arrows represent data reading, indicating that data is sent back in response to a data request. Because starting of the control circuit in the DA and confirmation of the end state are necessary, seven exchanges of signals are necessary between the CM 40 and DA 42 in order to perform a single data transfer. Between the DA 42 and disk 200, two signal exchanges are required.

Thus it is clear that low latency is required for the connection between the cache control unit 40 and the disk adapter 42, whereas an interface with fewer signals can be used between the disk adapter 42 and disk device 200.

Next, read/write access of the above-described system disk drives 453, 454 is explained. Read/write access from the CM (CPU) 40a is similar to that in FIG. 5 and FIG. 6, with DMA transfer performed between the memory 40b and the system disk drives 453, 454. That is, a DMA circuit is provided in the fiber channel circuit 452 of FIG. 2, and the CPU 400 (410) prepares a descriptor and starts the DMA circuit of the fiber channel circuit 452.

For example, reading of firmware, log data, and backup data (including data saved from the cache area) on the system disk drive is similar to that of FIG. 5; the CPU 400 (410) creates an FC header and descriptor, and by starting the DMA circuit (read operation) of the fiber channel circuit 452, the firmware, log data, and backup data are transferred by DMA from the system disk drive 453, 454 to the memory 40b.

Similarly, writing of log data and backup data is similar to that in FIG. 6; the CPU 400 (410) creates an FC header and descriptor, and by starting the DMA circuit (write operation) of the fiber channel circuit 452, log data and backup data are transferred by DMA to the system disk drive 453, 454 from the memory 40b. This log data writing is executed periodically, or when a fixed amount of log data is accumulated in the memory 40b, or when power is turned off.

By thus incorporating system disks into controllers, even when problems arise in a path between controllers and the BRTs and disk enclosures, if the controller and other paths are normal, firmware and apparatus configuration backup data can be read by the controller from the system disk, and operations employing other paths are possible. Moreover, a controller can read and write log data to and from a system disk, so that analysis upon occurrence of a fault and diagnostics for fault prevention are possible.

Further, when in the event of a power outage the power is switched to batteries and the data in cache memory is backed up to a system disk, there is no need to supply power to a disk enclosure, so that the battery capacity can be made small. And, because there is no need to write backup data to a system disk via a disk adapter or cable, the write time can be shortened, so that the battery capacity can be made small even for a large write memory capacity.

Further, because a pair of system disk drive is provided in a redundant configuration, even if a fault were to occur in one of the system disk drives, backup using the other system disk drive would be possible. That is, a RAID-1 configuration can be adopted.

The service processor 44 of FIG. 2 can also access the system disk drives 453, 454 via the bridge circuit 450. Firmware and apparatus configuration data are downloaded from the service processor 44 to the system disk drives 453, 454.

Mounted Configuration

Figure 7:
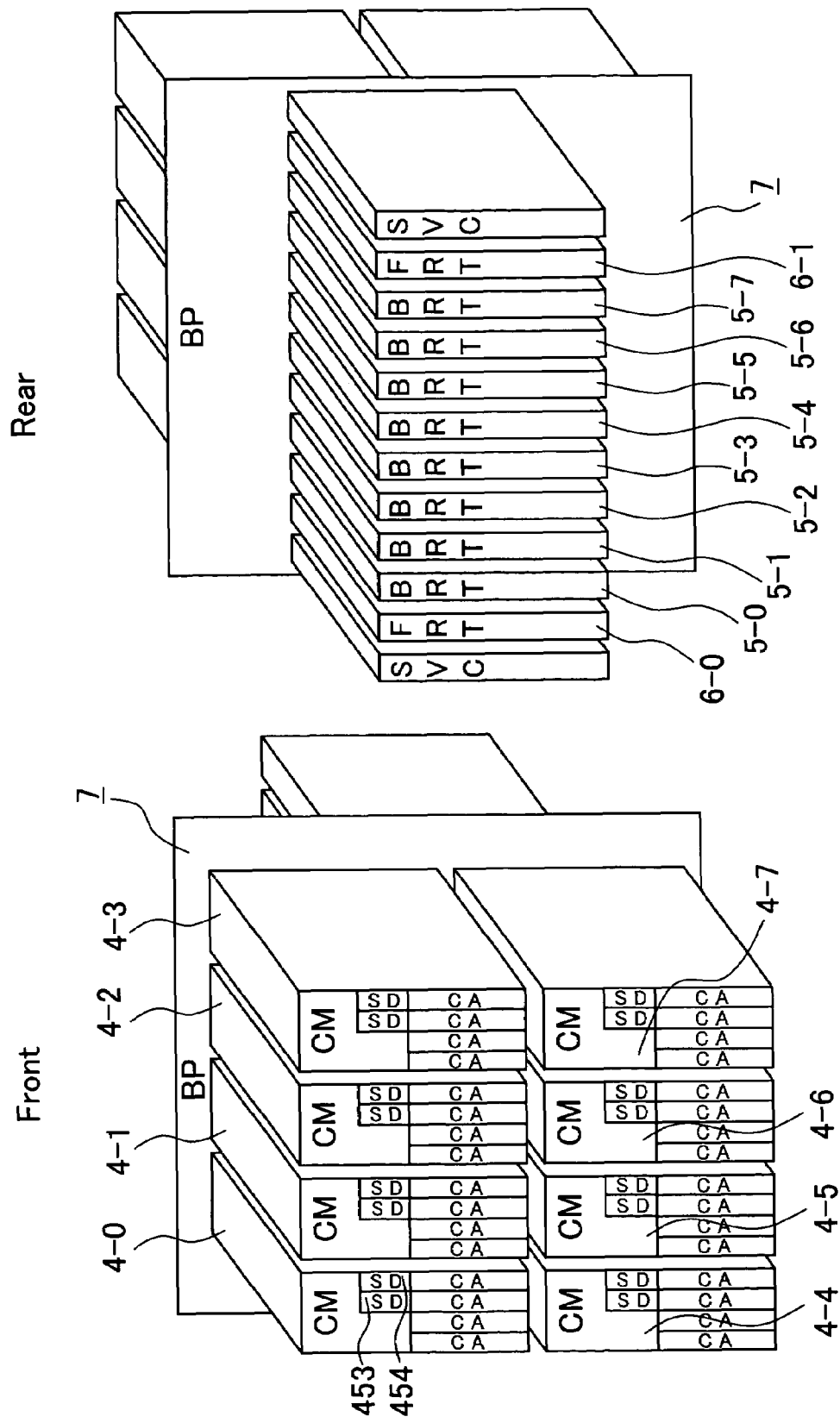
FIG. 7 shows the mounted configuration of a control module in one embodiment of the invention.
Figure 8:
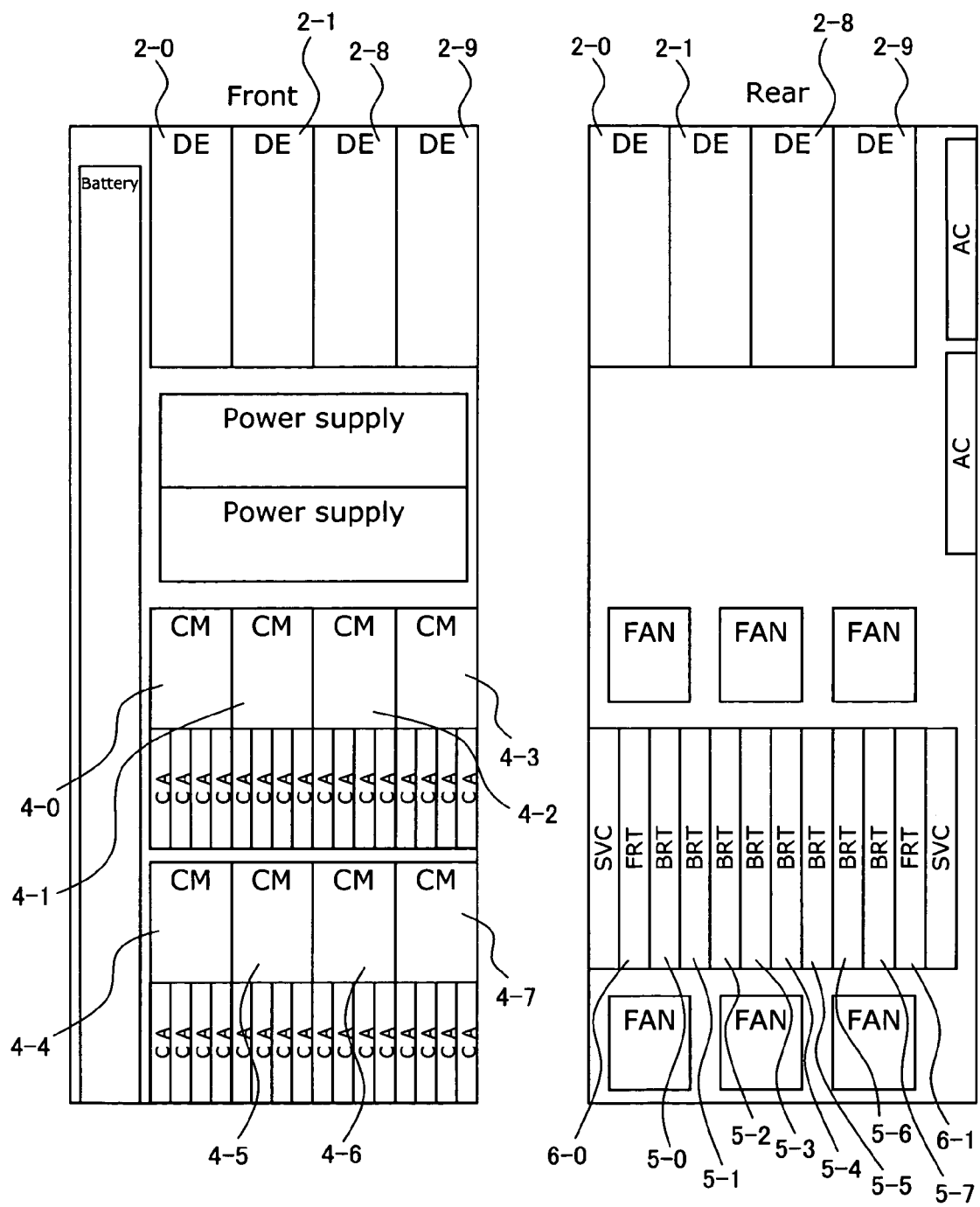
FIG. 8 shows an example of the mounted configuration of a data storage system in one embodiment of the invention.

FIG. 7 shows an example of the mounted configuration of control modules of this invention, and FIG. 8 shows a mounted configuration example, including disk enclosures and the control modules of FIG. 7.

As shown in FIG. 8, on the upper side of the storage apparatus housing are installed four disk enclosures 2-0, 2-1, 2-8, 2-9. Control circuits are installed in the lower half of the storage apparatus. As shown in FIG. 7, the lower half is divided into front and back by a back panel 7. Slots are provided in the front side and in the back side of the back panel 7. This is an example of the mounted structure of a storage system with eight CMs installed, larger in scale than the four CMs 4-0 to 4-3 of FIG. 1; but except for the different number of CMs, the configuration is the same.

That is, as shown in FIG. 7, eight CMs 4-0 to 4-7 are positioned on the front side, and two FRTs 6-0, 6-1, eight BRTs 5-0 to 5-7, and a service processor SVC (symbol "44" in FIG. 2) in charge of power supply control and similar, are positioned on the back side.

Two system disk drives 453, 454 are provided in each of the CMs 4-0 to 4-7. In FIG. 7, the symbols "453" and "454" are assigned to the system disk drives (SDs) of CM 4-0; the configuration is similar for the other CMs 4-1 to 4-7, but these are omitted in order to avoid complicating the drawing. These system disk drives 453, 454 can be inserted and removed from the back panel 7.

In FIG. 7, the eight CMs 4-0 to 4-7 and two FRTs 6-0, 6-1 are connected, via the back panel 7, to a four-lane PCI-Express bus. The PCI-Express has four signal lines (for differential, bidirectional communication) in a lane, so that there are 16 signal lines in four lanes, and the total number of signal lines is 16×16=256. The eight CMs 4-0 to 4-7 and eight BRTs 5-0 to 5-7 are connected via the back panel 7 to fiber channel. For differential, bidirectional communication, the fiber channel has 1×2×2=4 signal lines, and there are 8×8×4=256 such signal lines.

Thus by selectively utilizing buses at different connection points, even in a large-scale storage system, connections between eight CMs 4-0 to 4-7, two FRTs 6-0 and 6-1, and eight BRTs 5-0 to 5-7 can be achieved using 512 signal lines. This number of signal lines can be mounted without problem on a back panel board 7, and six signal layers on the board are sufficient, so that in terms of cost this configuration is fully realizable.

In FIG. 8, four disk enclosures, 2-0, 2-1, 2-8, 2-9 are installed; the other disk enclosures, 2-3 to 2-7 and 2-10 to 2-15, are provided in separate housings.

Because one-to-one mesh connections are provided between the disk adapters 42a, 42b of each of the control modules 4-0 to 4-7 and the BRTs 5-0 to 5-7, even if the number of control modules 4-0 to 4-7 comprised by the system (that is, the number of disk adapters 42a, 42b) is increased, fiber channel with a small number of signal lines comprised by the interface can be employed for connection of the disk adapters 42a, 42b to the BRTs 5-0 to 5-7, so that problems arising from mounting can be resolved.

Thus if, for example, system disk drives of size approximately 2.5 inches are used, mounting (incorporation) in CM 4-0 and similar is easily accomplished, and so no problems are posed by mounting.

Log Data Output Method Upon Controller Abnormality

Figure 20:
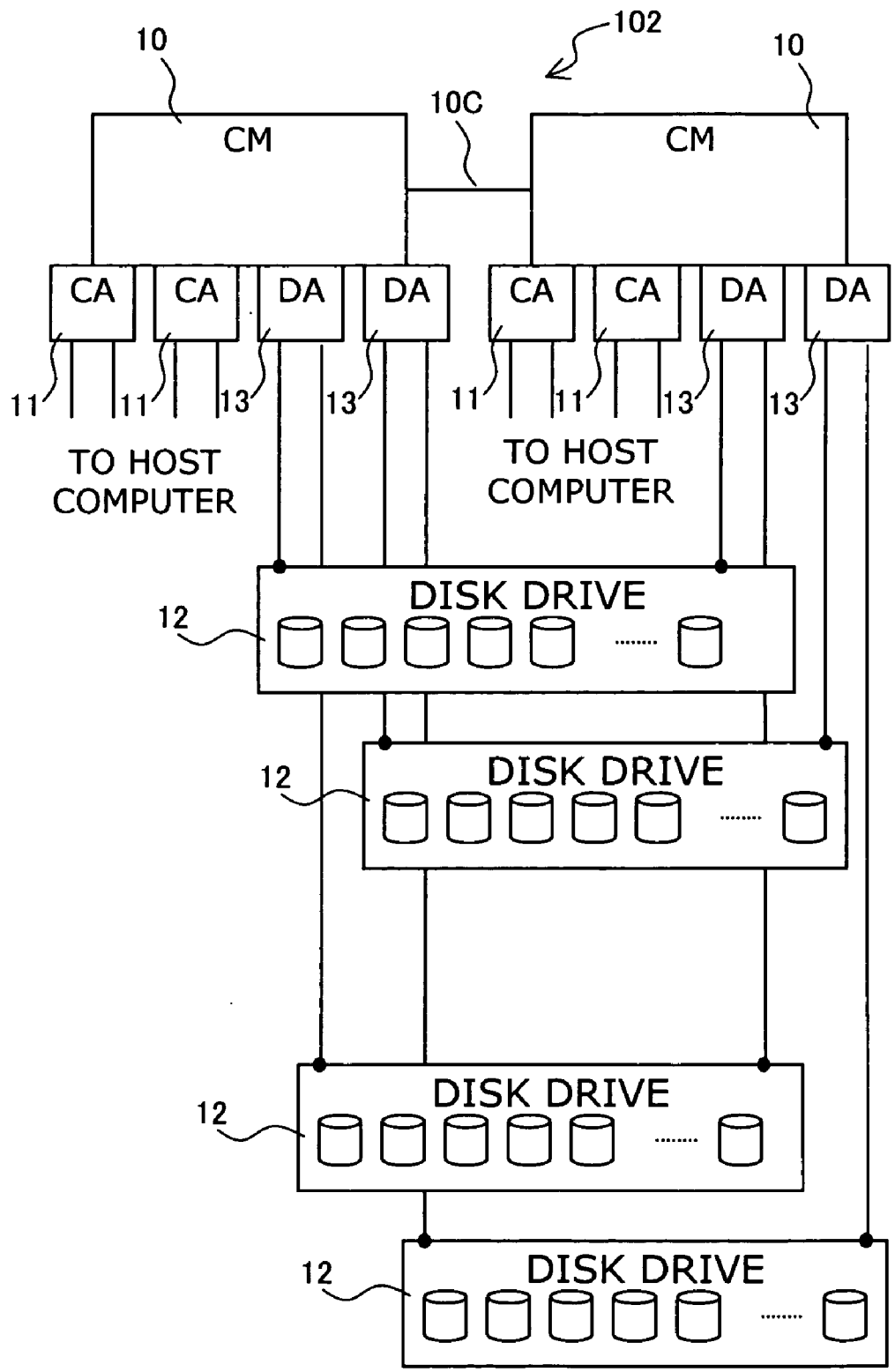
FIG. 20 shows the configuration of a storage system of the prior art.

As shown in FIG. 2, by installing the system disk drives 453, 454 in the CM 4-0 and similar, the above-described advantages accrue, but problems arise which are different from those of an apparatus with system disk drives installed in disk enclosures, such as in the configuration of the prior art in FIG. 20.

Log data, comprising log data for tasks and threads in progress in each of the CMs 4-0 to 4-3, is stored in the system disk drives 453, 454 for the CM. In the conventional configuration of FIG. 20, even if a malfunction occurs in one CM in the system, the other CMs can access the system disk drives of the malfunctioning CM, and log data output is possible.

But as shown in FIG. 2, when the system disk drives 453, 454 are installed in CM 4-0, if there is a malfunction due to some problem with the CM 4-0, there are cases in which the system disk drives 453, 454 of the CM 4-0 cannot be accessed; in such cases, log data output is not possible.

Below, a log data output control method is explained for avoiding states in which log data output is not possible in the event of a CM abnormality.

FIG. 9 through FIG. 14 explain a method of log data output (log data output method) of one embodiment of the invention. This method is a method of mounting a system disk drive 454, mounted in the abnormal CM 4-0, in a system disk slot of a normally operating CM 4-1, and of outputting the log data of the abnormal CM 4-0.

Figure 9:
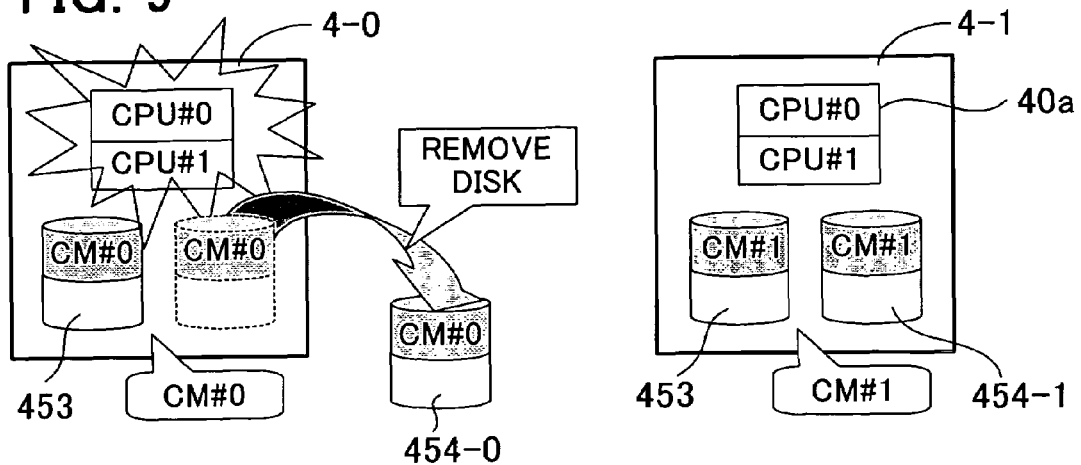
FIG. 9 explains the operation of removing a disk of an abnormal controller in the log data output method of one embodiment of the invention.

(1) As shown in FIG. 9, when an abnormality occurs in the control module (CM) 4-0, the system disk drive 454-0 installed in the abnormal CM 4-0 is removed from the abnormal CM 4-0.

Figure 10:
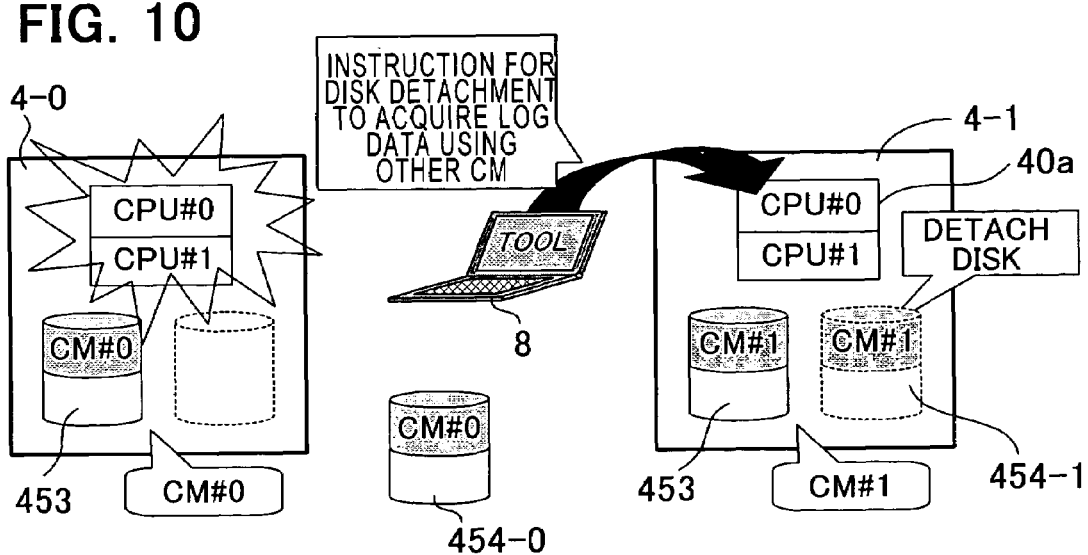
FIG. 10 explains the operation of disk separation in the log data output method of one embodiment of the invention.

(2) Next, as shown in FIG. 10, a normally operating CM 4-1 is connected to a maintenance and diagnostics apparatus 8 comprising a personal computer, and one of the system disk drives 454-1 installed within the CM 4-1 is separated from the apparatus 4-1 under a data output mode separation instruction.

Figure 11:
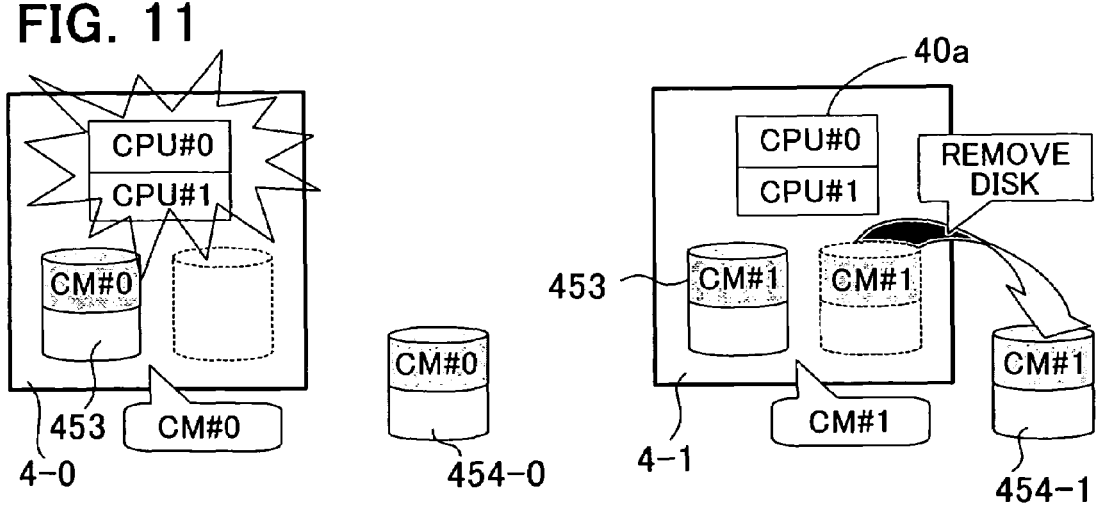
FIG. 11 explains normal controller disk removal operation in the log data output method of one embodiment of the invention.

(3) Next, as shown in FIG. 11, after completion of separation of the system disk drive 454-1 for the CM 4-1, the system disk drive 454-1 is removed from the apparatus 4-1.

Figure 12:
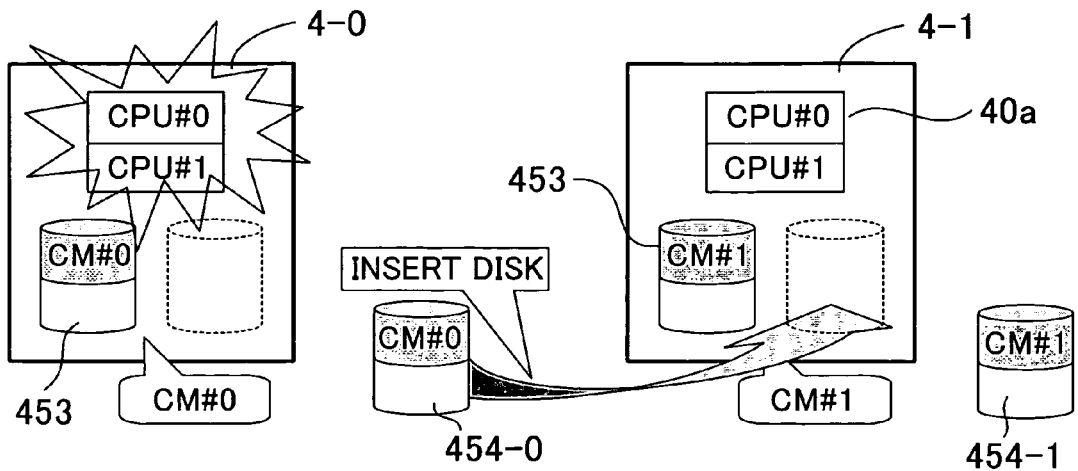
FIG. 12 explains disk insertion operation in the log data output method of one embodiment of the invention.

(4) As shown in FIG. 12, the system disk drive 454-0 which had been installed in and then removed from the abnormal CM 4-0 is inserted into the system disk slot of the normal CM 4-1, from which the system disk drive has been removed.

Figure 13:
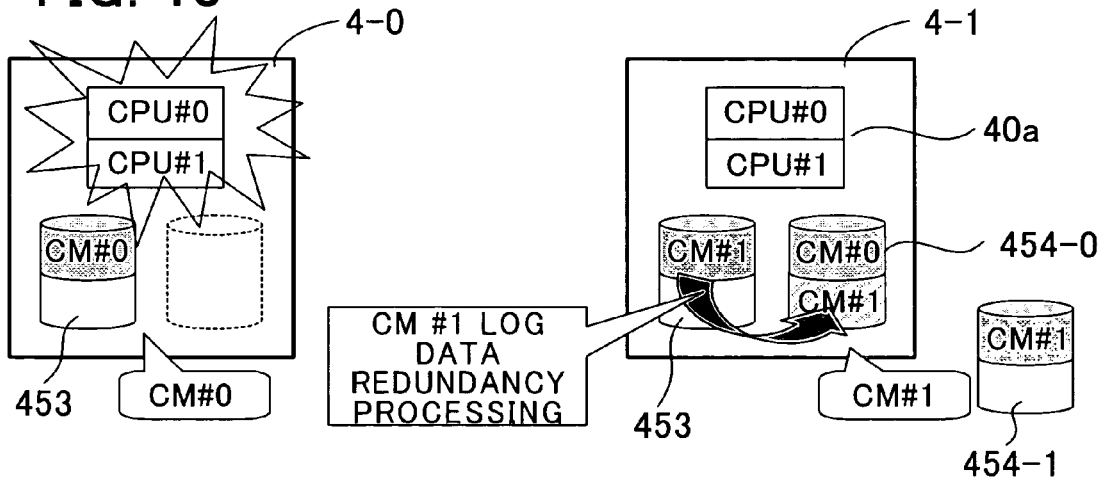
FIG. 13 explains log data redundancy operation in the log data output method of one embodiment of the invention.

(5) As shown in FIG. 13, the CM 4-1 detects the mounting of the system disk drive 454-0, and without affecting the log data area CM #0 of the abnormal CM 4-0 in the system disk drive 454-0, the log data CM #1 of the normal CM 4-1 in the system disk drive 453 is copied to a log data spare area for the system disk drive 454-0 by using rebuild/copy back processing. By this means, the log data CM #1 of the normal CM 4-1 is subjected to redundancy processing.

Figure 14:
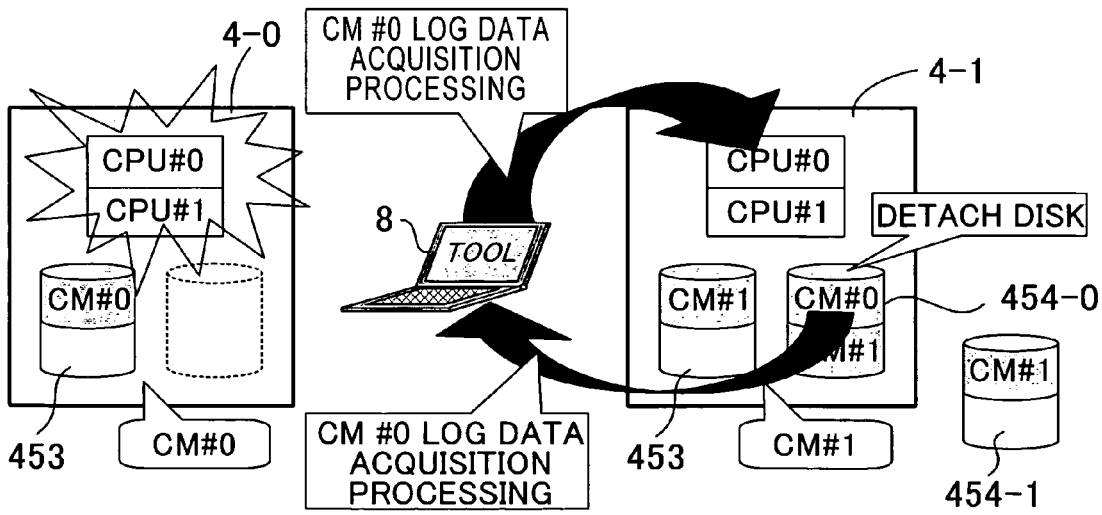
FIG. 14 explains log data output operation in the log data output method of one embodiment of the invention.

(6) As shown in FIG. 14, the maintenance/diagnostics apparatus 8 instructs the normal CM 4-1 to acquire the log data CM #0 of the abnormal CM 4-0. The normal CM 4-1 outputs the log data CM #0 in the mounted system disk drive 454-0 of the abnormal CM to the maintenance/diagnostics apparatus 8.

By this means, fault analysis of an abnormal CM 4-0 can be performed by the maintenance/diagnostics apparatus 8, using log data from the abnormal CM.

Because this method does not require equalization processing (copy processing) of log data for the system disks of each of the CMs, the processing burden can be alleviated. Normally when a disk drive is exchanged, rebuild/copy back processing is executed automatically, so that the data in the exchanged disk is lost; but in this embodiment, even when the relevant system disk drive is mounted on a different CM, a spare area is specified, so that the log data can be output and fault analysis can be performed more efficiently.

Log Data Output Processing Upon Controller Abnormality

Figure 15:
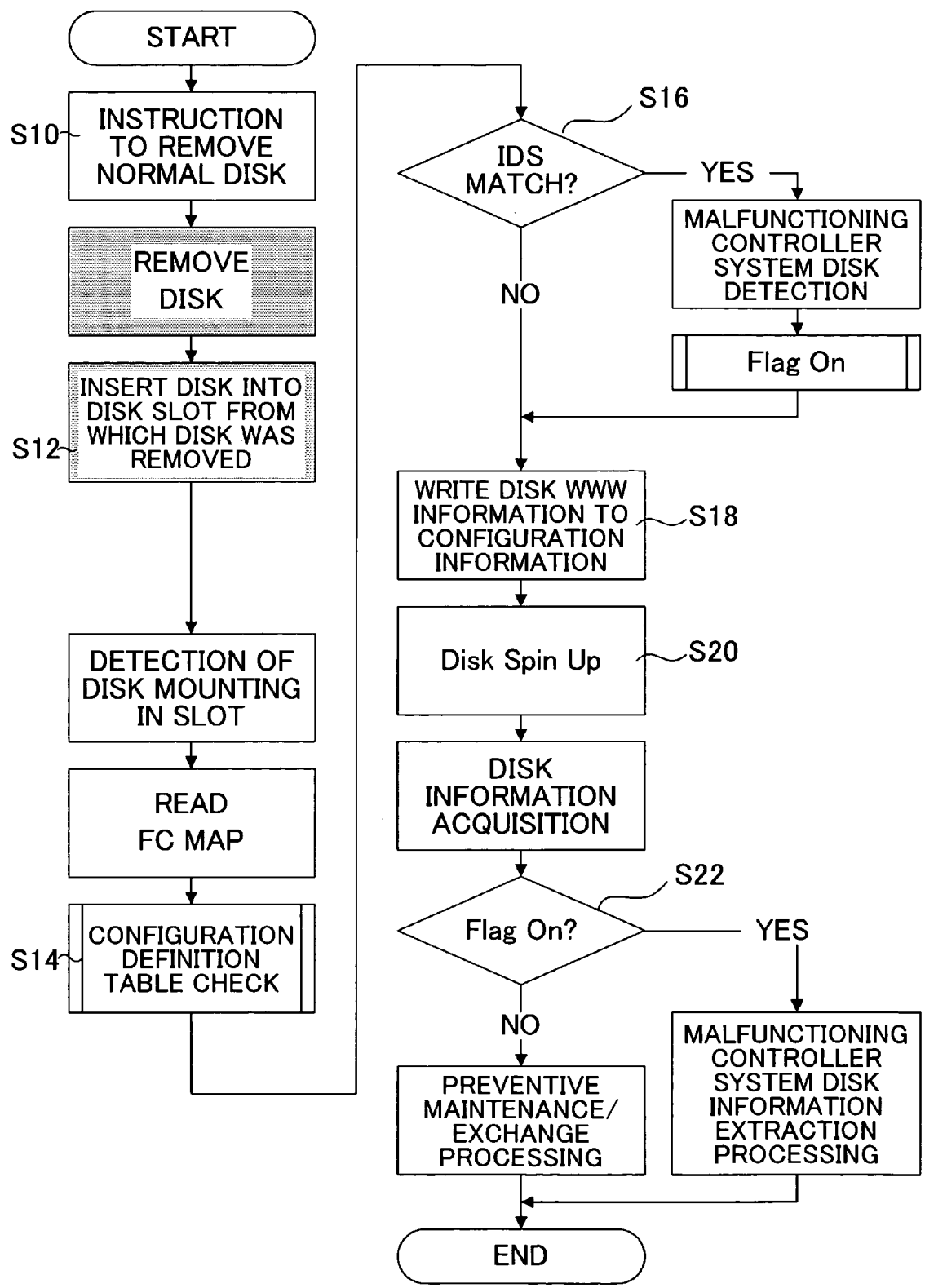
FIG. 15 shows the flow of log data output processing in one embodiment of the invention.
Figure 18:
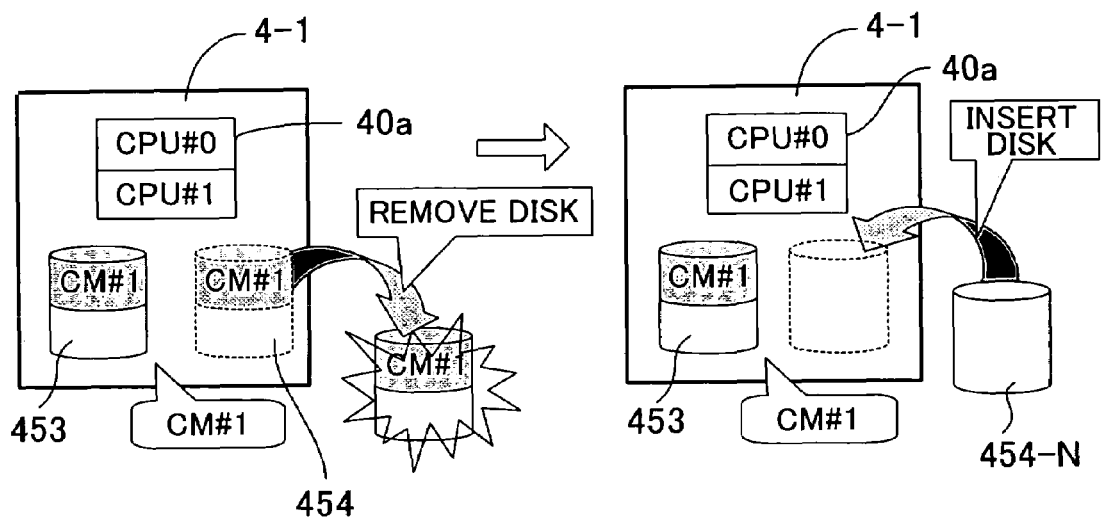
FIG. 18 explains disk exchange operation in the maintenance and exchange processing of FIG. 15.
Figure 19:
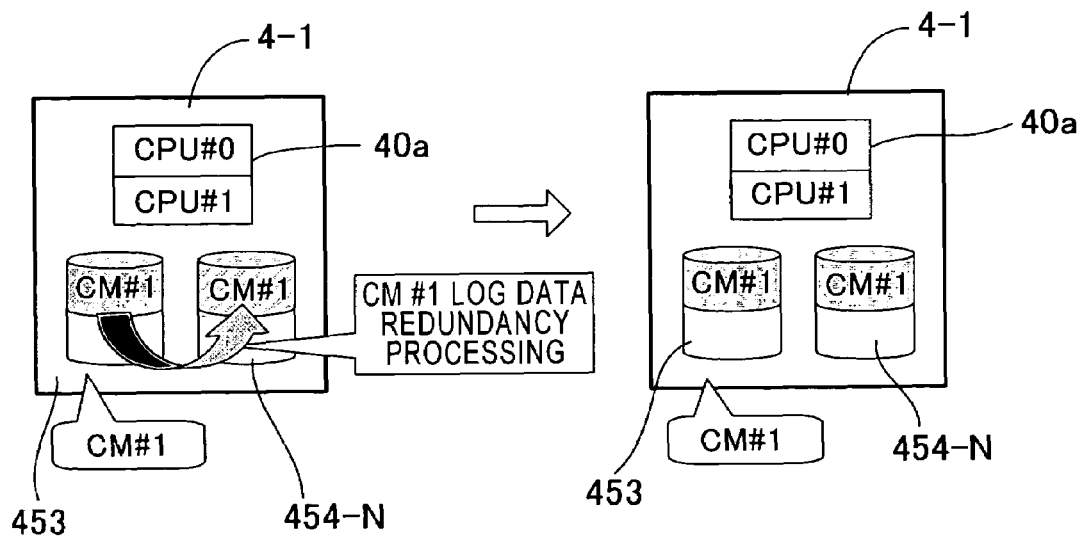
FIG. 19 explains log data redundancy operation in the maintenance and exchange processing of FIG. 15.

FIG. 15 shows the flow of log data output processing upon occurrence of a controller abnormality in one embodiment of the invention, FIG. 16 explains the configuration definition table in FIG. 15, FIG. 17 shows the flow of information extraction processing in FIG. 15, and FIG. 18 and FIG. 19 explain the exchange processing of FIG. 15. FIG. 15 shows the log data output processing for a normal CM 4-1.

(S10) As shown in FIG. 10, the normally operating CM 4-1 receives from the connected maintenance/diagnostics apparatus 8 an instruction to separate one of the system disk drives 454-1 within the CM 4-1, and separates the system disk drive 454-1 from the apparatus 4-1. As shown in FIG. 11, an attendant or similar then removes the system disk drive 454-1 from the apparatus 4-1, and the CM 4-1 detects this removal. For example, the output of connector pins is detected.

(S12) As shown in FIG. 12, the system disk drive 454-0, which had been mounted in and was removed from the abnormal CM 4-0, is inserted into the system disk slot of the normal CM 4-1 from which the system disk drive 454-1 has been removed. The normal CM 4-1 monitors the state within the FC paths, and detects the insertion of the system disk drive 454-0, that is, the connection to a path. The CM 4-1 then reads the WWN (World Wide Name) on the FC map from the system disk drive 454-0.

(S14) Next, the CM 4-1 judges whether the inserted system disk drive had been mounted in an abnormal CM, or is a drive for exchange. To this end, the CM 4-1 references the configuration information definition table 470 shown in FIG. 16 (also shown in FIG. 2). As indicated in FIG. 16, the configuration information definition table 470 stores the WWNs and abnormality information F for the system disk drives of all CMs and for user disk drives. For example, as information for the two system disk drives 453, 454 mounted in CM-0, the World Wide Names WWN-1, WWN-2 and abnormality information F are stored. When for example an abnormality occurs in CM 4-0, the CM 4-1 is notified, and the abnormality information fields for the system disk drives of CM 4-0 are set to abnormality. The CM 4-1 employs the previously read WWN described above to reference the system disk fields in the configuration information definition table 470, and judges whether the WWN coincides with a WWN of the abnormal CM 4-0.

(S16) If the CM 4-1 judges that the previously read WWN coincides with a WWN of the abnormal CM (ID coincidence), it is judged that a system disk drive 454-0 of a malfunctioning CM has been inserted, the read mode flag is turned on, and processing advances to step S18. If on the other hand the CM 4-1 judges that the WWN which has been read does not coincide with a WWN of the abnormal CM (ID non-coincidence), it is judged that a system disk drive for exchange has been inserted, and processing advances to step S18.

(S18) The CM 4-1 then writes the WWN read for the system disk drive in its own system disk drive field in the configuration information definition table 470.

(S20) The CM 4-1 starts the inserted disk drive, and reads the disk information (for example, the vendor name, product name, disk version, and similar).

(S22) The CM 4-1 checks the read mode flag, and if the flag is set to on, performs the information extraction processing of FIG. 17, but if the flag is not set to on, performs the exchange processing of FIG. 18 and FIG. 19. Processing then ends.

Information extraction processing is explained using FIG. 17. In this processing, the log data area CM #0 of the abnormal CM 4-0 in the system disk drive 454-0 explained in the above FIG. 13 is not in any way affected, while the log data CM #1 of the normal CM 4-1 in the system disk drive 453 is rebuild/copy back processed to a log data spare area of the system disk drive 454-0, and the log data CM #1 of the normal CM 4-1 is made redundant.

(S30) The CM 4-1 begins data equalization processing from its own pair of system disk drives 453. First, the CM 4-1 acquires the disk area information for the system disk drive 454-0, and detects the log data area CM #0 of the abnormal CM 4-0.

(S32) The CM 4-1 sets the write start position from this log data area (spare log area) of the log data CM #1 for the normal CM 4-1 in the system disk drive 453.

(S34) As explained in FIG. 13, the CM 4-1 reads the log data #1 on the system disk drive 453, and copies this data to the log data spare area of the system disk drive 454-0, to render redundant the log data CM #1 of the normal CM 4-1.

Next, the maintenance/exchange processing of FIG. 15 is explained using FIG. 18 and FIG. 19. Maintenance/exchange processing is processing to render redundant a normal system disk drive, and is primarily performed for maintenance purposes. That is, copy back operation is performed to an exchange disk with the same layout as the normal CM system disk.

As shown in FIG. 18, the system disk drive 454 in question is removed from CM 4-1, and an exchange disk drive 454-N is inserted into the system disk slot from which the system disk drive 454 was removed. Then, after detection of mounting of the exchange system disk drive 454-N as indicated in FIG. 19, copy back processing from the normal system disk drive 453 is used to render the log data redundant. When log data redundancy processing is completed, normal operation is initiated.

In this way, even if system disk drives are built into controllers, the log data on system disks in an abnormal controller can be output. Further, log data redundancy processing is performed by normal controllers, so that a normal controller can perform log data redundancy processing using a pair of system disk drives.

Because there is no need to perform equalization processing of log data on the system disks of each controller, the burden of log data equalization processing can be alleviated. Moreover, even when a system disk drive is mounted on another controller, loss of the log data for the anomalous controller can be prevented.

Other Embodiments

In the above-described embodiment, log data output processing was explained for an example of two control modules; but similar application is possible when there are three or more control modules. The number of channel adapters and disk adapters within control modules can be increased or decreased as necessary.

As the disk drives, hard disk drives, optical disc drives, magneto-optical disc drives, and other storage devices can be employed. Further, the configuration of the storage system and controllers (control modules) is not limited to that of FIG. 1, and application to other configurations (such as for example that of FIG. 20) is possible.

In the above, embodiments of this invention have been explained, but various modifications can be made within the scope of the invention, and these modifications are not excluded from the scope of the invention.

Because system disks are incorporated into control modules, even if problems occur in a path between a control module and a disk storage device, a control module and another path can be used to read firmware and apparatus configuration backup data from a system disk, and operation using other paths is possible; further, log data can be read and written, so that analysis upon occurrence of a fault and diagnostics for fault prevention are possible.

Moreover, even when an abnormality occurs in one control module, a system disk drive of the one control module can be inserted into another control module, and data for the one control module can be read, so that even when system disk drives are incorporated into control modules, the log data on a system disk of an anomalous control module can be output. Consequently a storage system with high reliability can be provided.

What is claimed is:

1. A data storage system, comprising:
a plurality of disk storage devices which store data; and
a plurality of control modules, connected to said plurality of disk storage devices, which control access to said disk storage devices according to access instructions from a higher-level system, each of said control modules comprising:
a channel adapter performing an interface with said higher-level system;
a disk adapter connected to said plurality of disk storage devices via a first line;
a memory, having a cache area which stores a portion of the data stored by said disk storage devices;
a control unit, which performs said access control;
a pair of system disk units, connected to said control unit, which store at least log data of said control unit; and
a system disk slot for inserting said system disk unit and connecting said inserted system disk unit to said control unit, wherein:
one control module, upon occurrence of an abnormality in another of said control modules, detects that one system disk unit of said another control module has been inserted into said system disk slot of said one control module, incorporates said one system disk unit of said another control module, and outputs log data of said one system disk unit of said another control module;
said channel adapter, said disk adapter and said pair of system disk unit are connected with said control unit; and
said one control module, after incorporating said one system disk unit of said another control module, copies log data of the system disk unit of said one control module to said incorporated system disk unit, without destroying log data of said another control module on the system disk unit of said another control module.

2. The data storage system according to claim 1, wherein a control unit of said one control module reads an identifier of said inserted system disk unit, and judges whether said one system disk unit of said another control module has been incorporated.

3. The data storage system according to claim 2, wherein the control unit of said one control module upon judging from said identifier that said inserted system disk unit is not one system disk unit of said another control module, copies log data of a system disk unit of said one control module to said incorporated system disk unit.

4. The data storage system according to claim 1, wherein said one control module reads the log data area of said incorporated system disk unit of said another control module, and copies, to an area other than said log data area of the system disk unit of said other control module, log data of the system disk unit of said one control module.

5. The data storage system according to claim 1, wherein said one control module separates another system disk unit of said one control module in response to an instruction of an external apparatus, and releases a system disk slot to enable insertion of a system disk unit of said another control module.

6. The data storage system according to claim 1, wherein said one control module outputs log data of said another control module in said incorporated system disk unit, in response to a log data acquisition instruction from an external apparatus.

7. The data storage system according to claim 6, wherein said one control module outputs the log data of said other control module to said external apparatus.

8. A log data output method upon an abnormality for a storage control apparatus having a plurality of control modules, connected to a plurality of disk storage devices which store data, which control access to said disk storage devices according to access instructions from a higher-level system, and in which each of said control modules has a channel adapter performing an interface with said higher-level system, a disk adapter connected to said plurality of disk storage devices via a first line, a memory having a cache area which stores a portion of the data stored by said disk storage devices, a control unit which performs said access control, and a pair of system disk units, connected to said control unit, which store at least log data of said control unit, and a system disk slot for inserting said system disk unit and connecting said inserted system disk unit to said control unit, said channel adapter, said disk adapter and said pair of system disk units are connected with said control unit, said method comprising:

- detecting, at the time of an abnormality in another control module, an insertion into said system disk slot of one control module of one system disk unit which has been removed from said another control module;
- incorporating said inserted one system disk unit of said another control module into said one control module;
- outputting, using said one control module, log data of said incorporated one system disk unit of said another control module; and
- after said one system disk unit of said another control module has been incorporated, copying log data of a system disk unit of said one control module to said incorporated system disk unit, without destroying log data of said another control module in the system disk unit of said another control module.

9. The log data output method upon an abnormality for a storage control apparatus according to claim 8, wherein said detecting further comprises:

- reading an identifier of said inserted system disk unit; and
- judging whether said one system disk unit of said another control module has been incorporated.

10. The log data output method upon an abnormality for a storage control apparatus according to claim 9, further comprising:

- when said inserted system disk unit is judged from said identifier not to be said one system disk unit of said another control module, copying log data of a system disk unit of said one control module to said incorporated system disk unit.

11. The log data output method upon an abnormality for a storage control apparatus according to claim 8, wherein said copying further comprises:

- reading the log data area of said incorporated system disk unit of said another control module; and
- copying the log data of the system disk unit of said one control module to an area other than said log data area of said system disk unit of said another control module.

12. The log data output method upon an abnormality for a storage control apparatus according to claim 8, further comprising:

- separating another system disk unit of said one control module, according to an instruction from an external apparatus; and
- releasing a system disk slot to enable insertion of a system disk unit of said another control module.

13. The log data output method upon an abnormality for a storage control apparatus according to claim 8, wherein said outputting further comprises:

- outputting log data of said another control module on said incorporated system disk unit, according to a log data acquisition instruction from an external apparatus.

14. The log data output method upon an abnormality for a storage control apparatus according to claim 13, wherein said outputting further comprises:

- outputting the log data of said another control module to said external apparatus.

* * * * *

UNITED STATES PATENT AND TRADEMARK OFFICE
CERTIFICATE OF CORRECTION

PATENT NO.        : 7,487,293 B2
APPLICATION NO.   : 11/220574
DATED             : February 3, 2009
INVENTOR(S)       : Masahiro Yoshida et al.

It is certified that error appears in the above-identified patent and that said Letters Patent is hereby corrected as shown below:

Column 16, Line 36, change "module" to --module,--.

Signed and Sealed this

Twenty-first Day of April, 2009

JOHN DOLL
*Acting Director of the United States Patent and Trademark Office*